United States Patent [19]
Wolf

[11] Patent Number: 5,363,193
[45] Date of Patent: Nov. 8, 1994

[54] METHOD AND ARRANGEMENT FOR DETERMINING ANGULAR VELOCITIES

[75] Inventor: Robert Wolf, Mörlenbach, Germany

[73] Assignee: Teldix GmbH, Heidelberg, Germany

[21] Appl. No.: 917,040

[22] PCT Filed: Jan. 23, 1991

[86] PCT No.: PCT/EP91/00121

§ 371 Date: Aug. 5, 1992

§ 102(e) Date: Aug. 5, 1992

[87] PCT Pub. No.: WO91/11682

PCT Pub. Date: Aug. 8, 1991

[30] Foreign Application Priority Data

Feb. 5, 1990 [DE] Germany ............... 4003326

[51] Int. Cl.$^5$ .......................... G01C 19/04
[52] U.S. Cl. .............................. 356/350
[58] Field of Search ..................... 356/350

[56] References Cited

U.S. PATENT DOCUMENTS 4,549,806 10/1985 Marten et al. ............... 356/350
4,765,739 8/1988 Koizumi et al. ............. 356/350
4,796,993 1/1989 Sonobe et al. ............... 356/350
4,883,358 11/1989 Okada ........................ 356/350
5,127,732 6/1992 Gackler ...................... 356/350

FOREIGN PATENT DOCUMENTS 3140110 4/1983 Germany .

OTHER PUBLICATIONS

Conference Proceedings OFS'84, 2nd Int'l. Conference on Optical Fiber Sensors, Sep. 5–7, 1984, Stuttgart, DE, VDE-Verlag GmbH (Berlin, DE); K. Böhm et al., "Fiber optical gyro..." pp. 251–258.

Primary Examiner—Davis L. Willis
Assistant Examiner—LaCharles Keesee, II
Attorney, Agent, or Firm—Spencer, Frank & Schneider

[57] ABSTRACT

A process and device are disclosed to measure angular speeds. In order to determine the Sagnac phase from the output signal of a fiber optic annular interferometer, without the need for costly circuits for regulating a phase modulator that acts on the interference light and for regulating the intensity of the light, the Sagnac phase shift $\phi$ is deduced from the amplitudes ($A_{\nu-1}$, $A_\nu$, $A_{\nu+1}$) of three spectral lines of the interference light that is emitted by the interferometer.

4 Claims, 1 Drawing Sheet

METHOD AND ARRANGEMENT FOR DETERMINING ANGULAR VELOCITIES

BACKGROUND OF THE INVENTION

The present invention relates to a method and to an arrangement for determining angular velocities with the aid of an optical fiber ring interferometer, wherein the light waves passing through at least one optical fiber winding are sinusoidally modulated in phase and the amplitudes of several spectral lines of the interfering light waves exiting from the optical fiber are identified to yield the Sagnac phase shift which is proportional to the angular velocity.

A method and an arrangement of this type are disclosed in DE 3,140,110.A1. In the optical fiber of the ring interferometer forming an annular light path, two oppositely directed light waves propagate and interfere with one another upon exiting from the optical fiber. The interference is a function of the angular velocity with which the optical fiber, which forms at least one winding, is rotated. The angular velocity is proportional to the difference in phase between the two light waves that passed through the optical fiber in opposite directions.

This phase difference, it is called the Sagnac phase shift, can be determined, as disclosed in DE 3,140,110.A1, from the amplitudes of the spectral lines of the interference light leaving the optical fiber. The method according to DE 3,140,110.A1, according to which the Sagnac phase shift is determined from the amplitude of two spectral lines requires that the modulation index of the phase modulation occurring at the output of the light path is kept at a constant value by means of a control circuit.

SUMMARY OF THE INVENTION

It is now the object of the invention to provide a method and an arrangement of the above mentioned type with which the Sagnac phase shift, which is proportional to the angular velocity, can be determined without a control circuit for keeping the modulation index of the phase modulation constant.

This is accomplished according to the invention by a method for determining angular velocities with an optical fiber ring interferometer, comprising the steps of passing sinusoidally phase modulated light waves through at least one optical fiber winding; determining the amplitude values for a first, a second, and a third spectral line of the interfering light waves exiting from the optical fiber; forming a first quotient from the amplitude values of the first and the second spectral lines, wherein one of the amplitude values is a function of the sine of the Sagnac phase shift, and the other amplitude value is a function of the cosine of the Sagnac phase shift; forming a second quotient from the amplitude values of the first and the third spectral lines, wherein both of the amplitude values are a function of the sine or the cosine of the Sagnac phase shift, so that the second quotient is solely a ratio of the Bessel functions associated with the first and third spectral lines as a function of a phase modulation index; determining, from the curves of the Bessel functions, a corresponding ratio of the Bessel functions associated with the first quotient for each ratio of the Bessel functions associated with the second quotient as a function of the phase modulation index; forming a product from the first quotient and the corresponding ratio of the Bessel functions associated with the first quotient; determining a Sagnac phase shift value $|\phi|$ from the arc tangent of the product; and determining an angular velocity of the optical fiber winding from the Sagnac phase shift value $|\phi|\equiv 1$.

The object is also accomplished according to the invention by an arrangement for determining angular velocities with the aid of an optical fiber ring interferometer which includes at least one optical fiber winding and a device for modulating the light waves propagating therein, with circuit units being provided which determine the amplitudes of several spectral lines of the interfering light waves that exit from the optical fiber to obtain therefrom the Sagnac phase shift that is proportional to the angular velocity, comprising a first divider which forms a first quotient from the amplitudes ($A_{\nu-1}$, $A_\nu$) of two of three spectral lines, of which one amplitude is a function of the sine and the other amplitude is a function of the cosine of the Sagnac phase shift; a second divider which forms a second quotient from the amplitudes ($A_{\nu+1}$, $A_{\nu-1}$) of two of the three spectral lines, with both amplitudes being a function of the sine or the cosine of the Sagnac phase shift, so that the second quotient is given solely by the ratio of the Bessel functions associated with these two spectral lines as a function of the phase modulation index; a first circuit unit which determines from the Bessel function curves for each ratio that is a function of the phase modulation index and is associated with the second quotient, the corresponding ratio of the Bessel function values associated with the first quotient; a multiplier which forms a product from the first quotient and the ratio of the Bessel function values associated with the first quotient as determined in the first circuit unit; and a second circuit unit which employs the arc tangent function for the product, thus obtaining the amount of the Sagnac phase shift $|\phi|$.

A further advantageous embodiment of the arrangement described above has the first circuit unit composed of a memory in which, for every possible ratio of Bessel function values associated with the second quotient, the corresponding ratio of the Bessel function values associated with the first quotient is stored in tabular form.

Because of the invention, an expensive control circuit is no longer required since the influence of the modulation index is not involved in the determination of the Sagnac phase shift.

DETAILED DESCRIPTION OF THE PREFERRED EMBODIMENT

Figure 1:
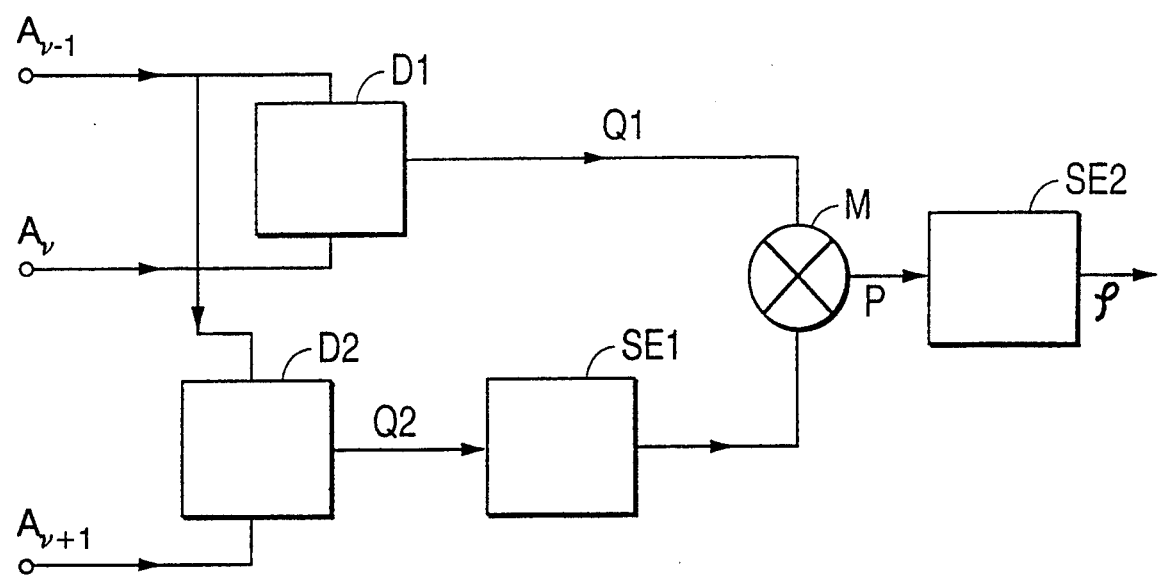
FIG. 1 is a block circuit diagram for a possible embodiment of the method according to the invention.

The invention will now be described in greater detail with reference to an embodiment thereof that is illustrated in FIG. 1.

For further processing, the optical output signal of the optical fiber of a ring interferometer is converted in a known manner to an electrical signal. This electrical output signal i(t) of the optical fiber ring interferometer is, as generally known, given by the following:

$$i(t) = 2I_0 \cos^2 \cdot \{\tfrac{1}{2}[2\phi + \psi_0 \sin 2\pi f_m t - \psi_0 \sin 2\pi f_m(t-\tau)]\} \quad (1)$$

In this equation, $I_0$ identifies the intensity of the light fed into the optical fiber, $\phi$ the Sagnac phase shift, $\psi_0$ the modulation index of the sinusoidal phase modulation performed with frequency $f_m$ and $\tau$ the delay of the light waves through the optical fiber.

The measuring value to be determined, the angular velocity $\Omega$ of the fiber ring interferometer, is proportional to the Sagnac phase shift as follows:

$$\Omega = \frac{\lambda \cdot c}{8\pi N \cdot A} \phi \tag{2}$$

Here, $\lambda$ is the wavelength of the light fed into the optical fiber, c is the speed of light, A is the area enclosed by the optical fiber and N is the number of windings in the optical fiber.

Equation (2) thus shows that the angular velocity $\Omega$ to be measured is directly dependent on the Sagnac phase shift $\phi$. It is now the object to determine the Sagnac phase shift $\phi$ from the output signal i(t) of the fiber ring interferometer.

With the following addition theorems:

$$\cos x/2 = \pm \sqrt{(1+\cos x)/2}$$

$$\sin x - \sin y = 2\cos[(x+y)/2]\sin[(x-y)/2]$$

and the following abbreviations:

$$\psi = \psi_0 \sin \pi f_m \tau = \psi_0 \sin \alpha$$

it follows from Equation (1) that:

$$i(t) = I_0\{1 + \cos[2\phi(t) + 2\psi\cos(2\pi f_m t - \alpha)]\} \tag{3}$$

and using:

$$\cos(x+y) = \cos x \cos y - \sin x \sin y$$

the following results:

$$i(t) = I_0\{1 + \cos[2\psi(t)]\cos[2\psi\cos(2\pi f_m t - \alpha)] - \sin[2\psi(t)]\sin[2\psi\cos(2\pi f_m t - \alpha)]\} \tag{4}$$

With Bessel functions of the first type, Equation (4) can be converted into the following form suitable for signal evaluation:

$$i(t) = I_0 \Bigg\{ 1 + \cos 2\phi \left[ J_0(2\psi) + 2\sum_{\nu=1}^{\infty}(-1)^{\nu}J_{2\nu}(2\psi)\cos 2\nu(2\pi f_m t - \alpha) \right] - \sin 2\phi \left[ 2\sum_{\nu=0}^{\infty}(-1)^{\nu}J_{2\nu+1}(2\psi)\cos(2\nu+1)(2\pi f_m t - \alpha) \right] \Bigg\} \tag{5}$$

Separated into its individual spectral lines, this output signal i(t) can be expressed as follows:

$$\begin{aligned} i(t) = \; & I_0[1 + J_0(2\psi)\cos 2\phi] - \\ & 2I_0 J_1(2\psi)\sin 2\phi \cos(2\pi f_m t - \alpha) - \\ & 2I_0 J_2(2\psi)\cos 2\phi \cos 2(2\pi f_m t - \alpha) + \\ & 2I_0 J_3(2\psi)\sin 2\phi \cos 3(2\pi f_m t - \alpha) + \\ & 2I_0 J_4(2\psi)\cos 2\phi \cos 4(2\pi f_m t - \alpha) \end{aligned} \tag{6}$$

where the factors $J_n(2\psi)$ with $n = 0, 1, 2, \ldots$ are the values of the first type of n-th order Bessel functions for the argument $2\psi = 2\psi_0 \sin \pi f_m \tau$.

Prerequisite for a determination of the angular velocity $\Omega(t)$ from output signal i(t) in Equation (6) is that the change of $\Omega(t)$ over time is so slow that the following applies for the bandwidth $B_\phi$ of the Sagnac phase shift which can be calculated by way of a Fourier transform:

$$B_\psi < < f_m$$

In that case, any desired spectral line of the spectral lines listed in (6), whose frequencies are integral harmonics of the modulation frequency $f_m$, can be separated by means of suitable filters and used to determine the Sagnac phase shift $\phi(t)$ and the angular velocity $\Omega(t)$, respectively. The amplitudes of the individual spectral lines listed in (6) that can be obtained at the outputs of such filters are then the following:

$$\begin{aligned} A_1 &= 2I_0 J_1(2\psi)|\sin 2\phi| \\ A_2 &= 2I_0 J_2(2\psi)\cos 2\phi \\ A_3 &= 2I_0 J_3(2\psi)|\sin 2\phi| \end{aligned} \tag{7}$$

Generally, if, for example, $\nu$ is even, the $\nu$-th spectral line amplitudes can be expressed as follows:

$$A_\nu = 2I_0 J_F(2\psi)\cos 2\psi \tag{8}$$

According to (7), for an even-numbered $\nu$, the amplitudes of, for example, three adjacent spectral lines of output signal i(t) are the following:

$$A_{\nu-1} = 2I_0 J_{\nu-1}(2\psi)|\sin 2\phi|$$

$$A_\nu = 2I_0 J_\nu(2\psi)\cos 2\phi$$

$$A_{\nu+1} = 2I_0 J_{\nu+1}(2\psi)|\sin 2\phi| \tag{9}$$

Arbitrary spectral lines can be employed just as well, if two of the three are a function of the cosine of the Sagnac phase shift or two of the three are a function of the sine of the Sagnac phase shift.

If one forms the quotient of the two amplitudes $A_{F-1}$ and $A_\nu$ of those two spectral lines of which one is a function of the sine of the amount of the Sagnac phase shift $|2\phi|$ and the other is a function of the cosine of the Sagnac phase shift, Equation (9) yields the following:

$$\frac{A_{\nu-1}}{A_\nu} = \frac{J_{\nu-1}(2\psi)}{J_\nu(2\psi)}|\tan 2\phi| \tag{10}$$

From (10), the amount of the Sagnac phase shift then results as follows:

$$|\phi| = \frac{1}{2} \arctan\left(\frac{A_{\nu-1}}{A_\nu} \cdot \frac{J_\nu(2\psi)}{J_{\nu-1}(2\psi)}\right) \quad (11)$$

The Sagnac phase shift $\phi$ can be determined as follows, without any influence from the modulation index $\psi$, with the aid of the circuit arrangement shown in FIG. 1:

Initially, three spectral lines are filtered out of the electrical output signal i(t) of the ring interferometer and their amplitudes $A_{F-1}$, $A_F$, and $A_{F+1}$ are determined. A first divider D1 forms a first quotient Q1 from amplitudes $A_{F-1}$ and $A_\nu$[see (11)] from two of the three spectral lines. For this purpose, those spectral lines should be picked out where one spectral line has an amplitude $A_{F-1}$ that is a function of the sine of the amount of the Sagnac phase shift $|\phi|$ and the other spectral line has an amplitude A, that is a function of the cosine of the Sagnac phase shift $\phi$ [see (9)].

As shown by Equation (11), if the Sagnac phase shift $\phi$ is determined from two spectral lines, there still exists some influence from the phase modulation index $\phi$ by way of the ratio of the Bessel functions $J_\nu(2\psi)/J_{F-1}(2\psi)$. The influence of the modulation index $\psi$ can be eliminated entirely if a third spectral line is additionally evaluated. In that case, a second divider D2 forms a second quotient from the amplitudes of two of the three filtered out spectral lines, both functions of the sine of the amount of the Sagnac phase shift $|\phi|$ or of the cosine of the Sagnac phase shift $\phi$.

Using, for example, the amplitudes $A_{F+1}$ and $A_{F-1}$ of (9), the following results:

$$\frac{A_{\nu+1}}{A_{\nu-1}} = \frac{2I_0 J_{\nu+1}(2\psi)|\sin 2\phi|}{2I_0 J_{\nu-1}(2\psi)|\sin 2\phi|} \quad (12)$$

$$\frac{A_{\nu+1}}{A_{\nu-1}} = \frac{J_{\nu+1}(2\psi)}{J_{\nu-1}(2\psi)}$$

Figure 2:
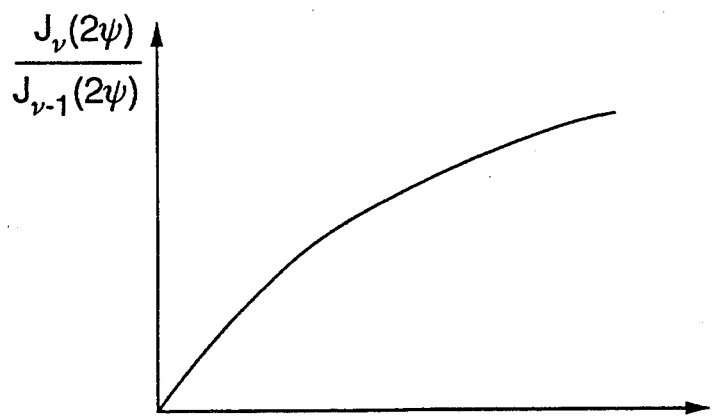
FIG. 2 shows the relationship between various Bessel functions.

Between the ratio of the Bessel functions $J_{F+1}(2\psi)/J_{F-1}(2\psi)$ given in (12) and the ratio of the Bessel functions $J_\nu(2\psi)/J_{F-1}(2\psi)$ occurring in (9) for the Sagnac phase shift $\psi$ there exists a relationship which is shown as an example in FIG. 2. By way of this relationship, each value ratio between two Bessel functions $J_{F+1}(2\psi)/J_{F-1}(2\psi)$ that changes with the argument $2\psi$ has a certain associated value ratio between two other Bessel functions $J_F(2\psi)/J_{F-1}(2\psi)$. This relationship can be found in the known Bessel function curves. The following applies:

$$\frac{J_\nu(2\psi)}{J_{\nu-1}(2\psi)} + f\left(\frac{J_{\nu+1}(2\psi)}{J_{\nu-1}(2\psi)}\right) \quad (13)$$

and, using (12):

$$\frac{J_\nu(2\psi)}{J_{\nu-1}(2\psi)} = f\left(\frac{A_{\nu+1}}{A_{\nu-1}}\right) \quad (14)$$

Thus, according to (14), each ratio of the measured amplitudes $A_{F+1}$ and $A_{F-1}$, by way of the above described relationship as illustrated schematically in FIG. 2, has an associated certain ratio between the Bessel functions $J_F(2\psi)$ and $J_{F-1}$ that are a function of the phase modulation index $\psi$. From (11) and (14) the following then follows for the amount of the Sagnat phase shift $|\psi|$:

$$|\phi| = \frac{1}{2} \arctan\left(\frac{A_{\nu-1}}{A_\nu} \cdot f\left(\frac{A_{\nu+1}}{A_{\nu-1}}\right)\right) \quad (15)$$

Thus, the amount of the Sagnac phase shift $|\phi|$ can be determined solely from the measured amplitudes $A_{F-1}$, $A_F$ and $A_{F+1}$ of three spectral lines and the relationship shown in FIG. 2 between measured amplitudes and Bessel functions, without the phase modulation index $\psi$ being included, nor fluctuations in the intensity $I_0$. Therefore it is an advantage that regulation of the light intensity $I_0$ and of the modulation index $\psi$ are no longer required.

The second quotient Q2 formed by the second divider D2 from the measured amplitudes $A_{F+1}$, and $A_{F-1}$ is fed to a first circuit unit SE1 which associates the second quotient, according to the function shown in FIG. 2, with a ratio of the Bessel function values $J_F(2\psi)/J_{F-1}(2\psi)$. This first circuit unit SE1 may be an analog function generator which simulates the function derived from the Bessel function curves. Less expensive would be a circuit unit SE1 composed of a memory in which the associated Bessel function value ratios $J_F(2\psi)/J_{F-1}(2\psi)$ for every possible amplitude ratio $A_{F+1}/A_{F-1}$ were stored in tabular form. A multiplier M forms the product P from the Bessel function value ratio $J_F(2\psi)/J_{F-1}(2\psi)$ determined in the first circuit unit SE1 for the respective amplitude ratio $A_{\nu+1}/A_{\nu-1}$ and the first quotient Q1 of amplitudes $A_{F-1}/A_F$. A second circuit unit SE2 employs the arc tangent function for this product P which then yields the amount of the Sagnac phase shift $|\phi|$. The second circuit unit SE2 either simulates the arc tangent function by analog circuit means or it is configured as a digital memory in which the arc tangent function is stored in tabular form.

I claim:

1. An arrangement for determining angular velocities with the aid of an optical fiber ring interferometer which includes at least one optical fiber winding and a device for modulating the light waves propagating therein, with circuit units being provided which determine the amplitudes of several spectral lines of the interfering light waves that exit from the optical fiber to obtain therefrom the Sagnac phase shift that is proportional to the angular velocity, comprising:

a first divider which forms a first quotient from the amplitudes ($A_{\nu-1}$, $A_\nu$) of two of three spectral lines, of which one amplitude is a function of the sine and the other amplitude is a function of the cosine of the Sagnac phase shift;

a second divider which forms a second quotient from the amplitudes ($A_{\nu+1}$, $A_{\nu-1}$) of two of the three spectral lines, with both amplitudes being a function of the sine or cosine of the Sagnac phase shift, so that the second quotient is given solely by the ratio of the Bessel functions associated with these two spectral lines as a function of the phase modulation index;

a first circuit unit which determines, from the Bessel function curves for each ratio that is a function of the phase modulation index and is associated with the second quotient, the corresponding ratio of the Bessel function values associated with the first quotient;

a multiplier which forms a product from the first quotient and the ratio of the Bessel function values associated with the first quotient as determined in the first circuit unit; and a second circuit unit which applies the arc tangent function to the product, thus obtaining the amount of the Sagnac phase shift $|\phi|$.

2. An arrangement according to claim 1, wherein the first circuit unit is composed of a memory in which, for every possible ratio of Bessel function values associated with the second quotient, the corresponding ratio of the Bessel function values associated with the first quotient is stored in tabular form.

3. An arrangement according to claim 1, wherein the second circuit unit is composed of a memory in which, for every possible product emanating from the multiplier, the arc tangent of the product is stored in tabular form.

4. An arrangement according to claim 1, wherein the first circuit unit is composed of a memory in which, for every possible ratio of Bessel function values associated with the second quotient, the corresponding ratio of the bessel function values associated with the first quotient is stored in tabular form; and the second circuit unit is composed of a memory in which, for every possible product emanating from the multiplier, the arc tangent of the product is stored in tabular form.

* * * * *